United States Patent [19]

Maringer

[11] 4,154,284
[45] May 15, 1979

[54] METHOD FOR PRODUCING FLAKE

[75] Inventor: Robert E. Maringer, Worthington, Ohio

[73] Assignee: Battelle Development Corporation, Columbus, Ohio

[21] Appl. No.: 826,798

[22] Filed: Aug. 22, 1977

[51] Int. Cl.² ............................................. B22D 23/08
[52] U.S. Cl. ........................................ 164/130; 264/8; 425/8
[58] Field of Search ................ 425/8; 264/8; 164/130, 164/427, 443

[56] References Cited

U.S. PATENT DOCUMENTS

| 2,358,068 | 9/1944 | Hiller | 264/8 |
| 3,838,185 | 9/1974 | Maringer et al. | 164/423 X |
| 3,854,850 | 12/1974 | Ueda et al. | 425/8 |
| 3,871,439 | 3/1975 | Maringer et al. | 164/423 X |
| 3,896,203 | 7/1975 | Maringer et al. | 264/8 X |

FOREIGN PATENT DOCUMENTS 7315 of 1910 United Kingdom ..................... 264/8

Primary Examiner—Robert L. Spicer, Jr.
Attorney, Agent, or Firm—Robert B. Watkins

[57] ABSTRACT

A method for producing metal flake of small length-to-width ratio or small length-to-thickness ratio directly from a pool or like source of molten metal or molten inorganic compound, or from an unconfined drop of molten metal or an unconfined drop of molten inorganic compound having a surface tension and viscosity similar to that of molten metal, consisting of forming such products by the application of a rotating, generally circular serrated edge, heat-extracting disk-like member to the surface of the pool of molten material so as to form the material into discrete flake particles by extracting the flake particles from the supply of molten material; and controlling the final shape of the product by the physical shape of the member, the temperature and material composition of the melt, as well as the velocity of the member in contact with the melt.

An apparatus for producing flake particles having a small length-to-width or small length-to-thickness ratio by extraction from a molten pool or unconfined drop comprising a rotatable heat-extracting member having a serrated circular peripheral edge with each serration having a leading surface angularly shaped to contact the surface of the molten material as the serration contacts molten material, and a shaft rotatably supporting the heat extracting member arranged to move closer to or further from the molten material.

14 Claims, 9 Drawing Figures

METHOD FOR PRODUCING FLAKE

BACKGROUND OF THE INVENTION

This invention relates to a method capable of producing flake particles directly from a supply of molten material by the use of a rotating member having discrete serrations in the peripheral edge thereof in which the leading surfaces of the serrations contact the molten material and have formed thereon flake particles.

As used herein the terms flake particles, flakes and flake refer to particles of relatively small size, in the hundredths of an inch range, and the terms include particles frequently referred to as powders because of their small size.

A large number of methods exist for the manufacture of metal flakes or powders. These range from various mechanical methods, such as grinding or filing to casting methods utilizing water or jets to break up a molten metal stream.

In recent years, attention has been directed toward those methods which produce a very fine particle size or very fine grain size within the particle. It has been observed that, when grain sizes or particle sizes decrease below several microns, there are significant advantages to be gained in terms of ease of processing and the quality and properties of the product. Flake particles having grain size in this small range are equally useful for consolidation by hot isostatic compaction, sintering, hot extrusion, or hot forging and rolling processes which yield products with properties equivalent to or better than those of the wrought alloys.

The surface areas of the flakes and powders are important also. While these fine powders are attractive, the huge surface areas created are readily contaminated, and handling becomes difficult. On the otherhand, larger particles with a very fine grain size are less easily contaminated, and retain many of the desirable characteristics of the very fine powders. It is desirable to produce a product which has a very fine grain size that is not so small as to have a large total surface area in a substantial quantity of individual product members. A discussion of this will be found in a paper published in Solidification Technology, pp. 317–336, NCIC in 1974.

Rapid quenching is probably the simplest method for producing small grain sizes. In general, higher quenching rates produce smaller grain sizes, with quench rates of the order of $10^6$ C. degrees change per second of time producing grain sizes (or dendrite arm spacing) of the order of one micron. For the most part, the standard gas or water atomization processes for powder manufacture are limited to quench rates below about $10^4$ C. per second, and therefore to dendrite arm spacing of 10 microns.

Splat quenching in which molten metal contacts a cool metallic surface provides quench rates that are very high. Splat quenching (cooling) has been practiced in the past by atomizing droplets against a rotating smooth cooling disc to produce powders of relatively uncontrolled configurations and irregular shapes, with a random distribution of variation in these parameters.

All of the prior art methods that are used to make flake particles have various deficiencies. For instance, a normal method would be to grind or chip or cut the ends of a wire or rod in progressive sectional slices, each ending up as a flake or powder particle. In this process, the wire or rod must be formed and mechanically worked to its appropriate cross section before the slicing operation, which is time-consuming and an extra expense. The slicing, grinding or chipping requires multiple tool faces which wear and become dull, requiring replacement, sharpening and other expensive treatments.

Other prior art methods using atomization and spraying are relatively uncontrolled from a particle size distribution and configuration standpoint. In these methods, an orifice is required which is a source of problems from a clogging and wear, etc., standpoint. In addition, the use of orifices have several attendant difficulties in that they must function in the severe environment of flowing molten metal. Where the molten metal product desired is composed of low-melting-point alloys, such as lead, tin, zinc, etc., the problems with the orifice are not severe. However, due to the commercial demand to continuously make a product out of materials having higher melting points, other processes using orifices are plagued with difficult problems.

The use of an orifice usually requires additional heating to insure that metal does not solidify in the orifice and thereby changes the shape of the product formed. The use of small orifices requires extremely clean melts to prevent intermittent plugging or restriction of the orifices.

The present invention forms the desired product directly from the molten state and without the need for controlling the size of the orifice or flow rate. Thus, though the advantages of high-quench cooling rates to produce flakes and powders are known, practical and controlled methods as well as apparatus for carrying this out are provided in this invention.

Although it is known in the laboratory to produce splat quench rates as high as $10^7$–$10^9$ C. degrees per second to produce grain sizes of less than 0.01 micron, from a practical commercial application, methods capable of producing the formed product are still being sought and have not been reported at quench rates above $10^4$ C. degrees per second.

In the present process the formation of the materials into final flake particles form is carried out while the material is formed directly from the molten state, and therefore inorganic compounds having properties in the molten state similar to that of molten metals and metal alloys may be formed in substantially the same manner. The properties that must be similar to those of molten metal are the viscosity and surface tension in the molten state, as well as the compound having a substantially discrete melting point, rather than the broad continuous range of viscosities characteristic of molten glasses.

Materials conforming to the class for this invention and having such properties will have a viscosity in the molten state when at a temperature of within 25% of their equilibrium melting point in degrees Kelvin in the range of $10^{-1}$ to 1 poise as well as having surface tension values in that same temperature range in the order of from 10 to 2500 dynes per centimeter.

The prior art discloses atomization of molten stream materials sprayed from an orifice upon the surface of a rotating copper roll. When the atomized stream strikes and splotches against the cool surface of the roll, rapid quenching takes place and a multitude series of random-shaped flakes are formed.

The present invention controls the shape and size of the final flake product. Controlling the size and shape, including thickness, are very important in determining the physical properties of the product when the size of the product is very small.

SUMMARY OF THE INVENTION

The invention as herein disclosed is a method and apparatus for producing flake particles directly from material having characteristics similar to molten metals, from pools of molten metals or from unconfined pendant drops of molten material by contacting the molten material to the serrated edge of a rotating disk-like member on which a flake particle is formed on the leading edge of each serration of the disc-like member. Each of the serrations on the periphery of the wheel has a single small particle formed on the leading edge.

For purposes of illustration of this invention, the product sizes are in the range of 0.015×0.01×0.002 inch. They have a range of width measurements of less than 10 times the thickness measurements and a range of length measurements of less than 3 times the width measurements.

In the method of this invention, the leading edges of the serration on the periphery of the cooling disk are caused to impact against the molten surface of the material, primarily by the rotation of the disk which advances the leading edge against the surface of the material. In order for the contact of the leading edge to be made with the surface of the molten material, the disk must be brought to a position on or near the equilibrium surface level of the molten material the product is produced from. This surface may be a molten pool-like surface or the edge of a molten pendant drop formed by the surface tension of the drop. The axis of disk rotation is moved toward or away from the surface to adjust the position.

The preparation of melts in pools of molten material is shown in U.S. Pat. No. 3,838,185. The apparatus controls associated therewith are also shown. The preparation of molten materials in unconfined pendant drops is disclosed in U.S. Pat. No. 3,896,203 which also reveals the apparatus and its control that is substantially the same as that required for this invention. The patents recited above in this paragraph are assigned to the same assignee and incorporated herein as necessary for adequate understanding of this disclosure.

DETAILED DESCRIPTION OF THE INVENTION

Figure 1:
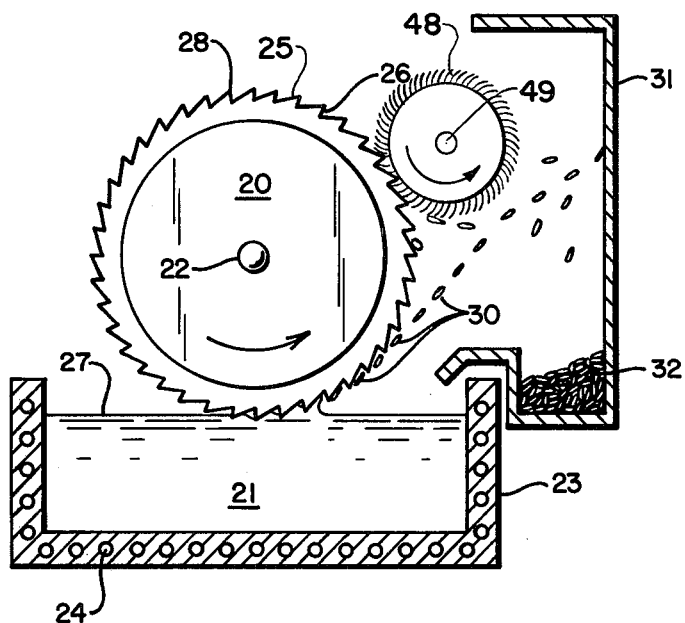
FIG. 1 is a vertical section of a melt container apparatus showing a rotating heat-extracting disk-like member having serrations on the periphery thereof producing flake particles from the surface of the molten material.

The means and apparatus by which the process of making flakes is carried out as illustrated in one embodiment in FIG. 1.

For the making of flakes a rotatable heat-extracting disk-like member 20 is rotated above a pool of molten material 21. Although the disk-like member 20 is described as a circular disk, other non-circular shapes might be used in certain circumstances. Disk 20 is rotated on a shaft 22 that is connected through a conventional type of transmission device, such as an electric motor, gear box or other well known apparatus, not shown.

The supply of molten material referred to as the melt 21 is heated and contained by a vessel 23 having elements 24 to heat the material contained to a temperature above its melting point. The outer "peripheral" edge of disk 20 is provided with sloping serrations or teeth 28 (synonymously referred to herein). Each serration has a sloping leading edge 25 and a radial face 26. The disk 20 and the shaft 22 are arranged to be raised and lowered relative to the surface 27 of the molten material 21. When in operation under proper conditions, the distance between the shaft 22 and surface 27 is reduced and the periphery of disk 20 is lowered into surface 27 causing the leading edges 25 of serrations 28 to strike and impact upon the surface 27 in a rapid stroking action. The relatively cool surface of the leading edge 25 impacts on the surface 27 forming a rapidly cooling wave at the front of the serration. Quenching begins immediately. As leading edge 25 leaves the wave front of surface 27, further quenching of the molten material takes place and flakes 30 are formed on the surface of the leading edge 25. Temporarily adhering to the surface, the flakes are lifted clear and raised to the point where centrifugal force and the resistance of the surrounding atmospheric air or other gas causes them to break clear and eject to a container 31. There they fall into a storage compartment portion 32. The release is not completely understood and it is thought that complex thermal stresses may have an effect in the release.

The supply of molten material referred to as a melt 21 may be composed of an elemental metal, metal alloy, or an inorganic compound. While the amount of superheat (number of degrees in excess of the material equilibrium point) will affect the size and thickness of flakes 30, it has been found that substantially uniformly shaped flakes can be produced with a melt at a temperature of within 25% of the equilibrium melting point (in degrees K) of the material used with no need for the precise control of the melt temperature during operations. While this quantitative definition of the preferred temperature will normally encompass the desired melt temperature, it should be understood that the process does not require unusual melt temperatures. Therefore the process is known to be operable with metals and metal alloys at conventional casting temperatures that represent a compromise between the cost of heating versus fluidity of the molten material. The melt 21 may have a thin protective flux coating to prevent excessive reaction with the surrounding atmosphere without substantially disturbing the formation of the flake particle 30. The flake particle is initially formed on the leading surface 25 of serration 28 beneath such flux and will pass through the surface flux upon exit without any adverse effects. Where it is desired or necessary, the simplicity of the apparatus lends itself to the use of a simple container (not shown) where an inert atmosphere is provided surrounding the melt and the flakes.

Figure 2:
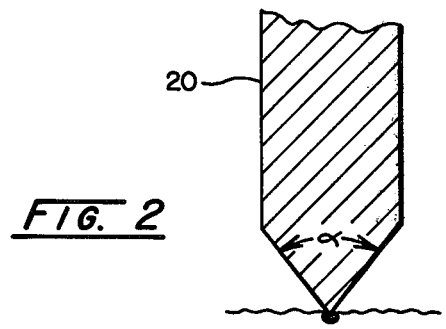
FIG. 2 is an enlarged cross section of a tip of a serration in a molten pool melt, illustrating the angle of taper toward the peripheral edge of the disk-like member.

Disk 20 is tapered near the outer edge, as shown in FIG. 2. By this means sufficient heat extracting structural mass is provided near the edge, but only a small surface is presented to the surface of the molten material. The angle of taper α in the cross section of the disk 20 may apparently be any value which, taking into account the other dimensions of the serrations, will produce relatively short and wide flake particles. Taper angles α of 60 degrees and 90 degrees have been demonstrated to provide suitable flakes.

Figure 3:
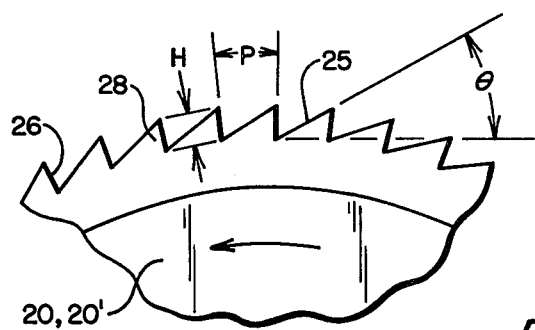
FIG. 3 is an elevation view of a portion of the disk-like member, illustrating dimensional aspects of the individual serrations on the periphery of the member.

As shown in FIG. 3, the slope of the serrations is established by the height H, from the tip to the base of the trailing edge 26, the circumferential distance p, (i.e., the pitch), and the angle θ between a line tangent to the peripheral projection at the base of the serration 28 and the surface of the leading edge 25. Experimental and preference values for these dimensions will be discussed later in this disclosure.

Figure 4:
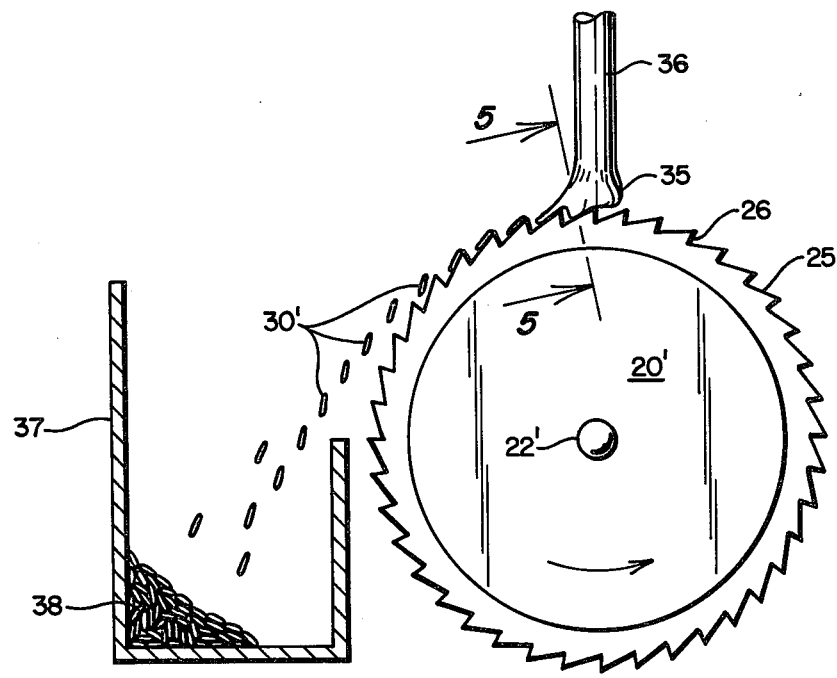
FIG. 4 is a side view of a rotating heat-extracting disk-like member forming flake particles from a pendant drop of molten material on a rod-like source of material, illustrating the contact of the serration on the material.
Figure 5:
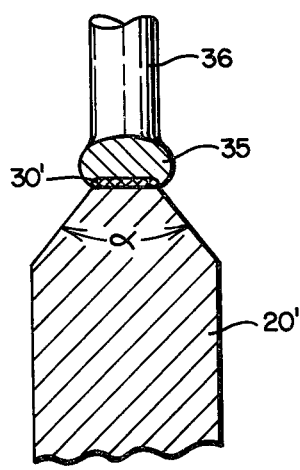
FIG. 5 is an enlarged cross section of the embodiment of FIG. 4, showing the molten material and the configuration of the flake particle on the surface of the serration at the edge of the rotating disk-like member.
Figure 6:
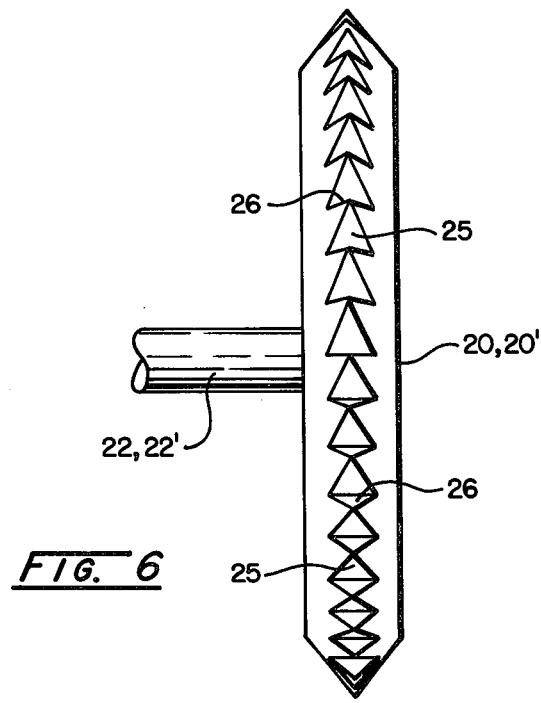
FIG. 6 is a plan view of a portion of the disk-like rotatable heat-extracting apparatus showing the shape of the serrations.

Another embodiment of the present invention is shown in FIGS. 4 and 5 where a rotating heat extracting disk-like member 20' having a V shaped tapered edge with an angle α' is rotated on a shaft 22' generally in the manner described for the embodiment of FIG. 1. However, in the embodiment of FIG. 4, flake particles 30' are formed at the top of the disk 20' by contact with a molten pendant drop 35 at the end of a rod 36 of material for the production of flakes.

Material 36 is heated locally at or near the end to form the molten pendant drop, by means not shown and not critical to the invention. There are numerous means available in the art to locally heat a rod of material and one skilled in the art can arrive at an operable embodiment without the need for excessive experimentation. For example, an oxygen-acetylene torch may be used with many materials and if an acetylene rich mixture is used it will have the advantage of providing a shielding atmosphere for the drop to reduce oxidation of the molten material. Various heating means may be used including resistance heating, induction heating, electron beam heating, etc. The means used for local heating of the solid source will be determined by considering the melting point of the material to be melted, the mass of the material to be molten at a given time and the rate at which the source material is to be heated to its melting point. If the heat supplied to the material is excessive, then the pendant drop may become too large to remain stable. If the heat is insufficient, the rotating disk-like member wll not have sufficient molten material to produce flake particles of controlled dimension.

Figure 8:
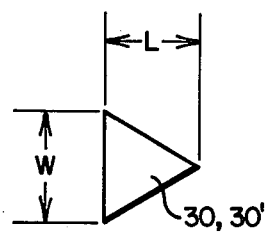
FIG. 8 shows a dimensional plan view of one form of a flake particle.
Figure 7:
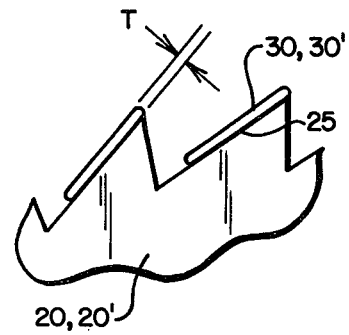
FIG. 7 is an enlarged elevational view of a portion of the edge of the rotatable heat-extracting disk-like member showing flake particles formed on the leading edges of the serrations and illustrating the thickness dimension of the flake particles.

In the operation of the embodiment of FIG. 4, leading surfaces 25' contact the molten pendant drop by impacting against the surface of the drop 35. Very rapid cooling (quenching) takes place as flake particle 30' is formed on the surface 25' as also shown in FIGS. 7 and 8. Flake particles 30, 30' have a thickness T, a length L, and a width W. The length L and the width W are a function of the shape of the underlying leading edge surface 25, 25'. Leading edge surfaces 25, 25' have a surface area, configuration, and dimensions that are determined by the edge taper angles α, α', the contact angle θ, the pitch P, and the height H.

With the continuing rotational progress of the disk 20', flake particles 30' are extracted from the molten pendant drop 35, solidified by the cooling effect of the surface 25', and ejected into a container 37 where they are collected in a storage portion 38.

As described for the previous embodiment, the flake particles 30' are removed from the surface 25' by resistance to the atmosphere and centrifugal force. However, in some instances with some materials, for both embodiments, it has been found helpful to insure the complete release of all flake particles by means of a light brushing or wiping action on the surface of the disk at a point beyond in rotation the position of normal ejection shown in FIGS. 1 and 4.

One means of wiping the surface is shown in FIG. 1. A wiper wheel 48 made of suitable soft polisher-like cloth material, such as a cotton buffing, is rotated on a shaft 49 in a position to wipe surfaces 25 and remove those particles 30 that have not been ejected by centrifugal force. Rotation of wheel 48 is contra to the rotation of drum 20 to provide maximum wiping action. Those flake particles 30 that are wiped from the drum 20 are projected by wheels 48 into the pile 32.

The stability of the molten pendant drop as utilized in the present invention is maintained when operating parameters disclosed herein as used. The area of the contact surface 25, 25' is small and tapers to a point at the moment contact is ended with the drop surface. This minimizes the disturbance of the drop surface which through surface tension is responsible for the stability of the drop form. The materials which may be processed thru the embodiment of FIG. 4 have been found to be the same as those that may be processed thru the embodiment of FIG. 1. These include most metals as well as chemical compounds and elements meeting the molten material requirements of, at a temperature within 25% of its equilibrium melting point in degrees K, the following properties: a surface tension in the range of 10 to 2500 dynes per centimeter, a viscosity in the range of $10^{-3}$ to 1 poise, a reasonable discrete melting point (i.e., a discontinuous temperature versus viscosity curve). In addition, the present invention is operable with metal alloys even though such alloys display a wide temperature range between the first solidification of any component within the alloy (the liquidus temperature) and the temperature at which the lowest melting point compositions solidify (the solidus temperature) yielding a completely solid material. For purposes of definition, such an alloy would be "molten" only above the liquidus temperature even though there is some material present at a temperature between the liquidus and solidus temperatures.

Figure 9:
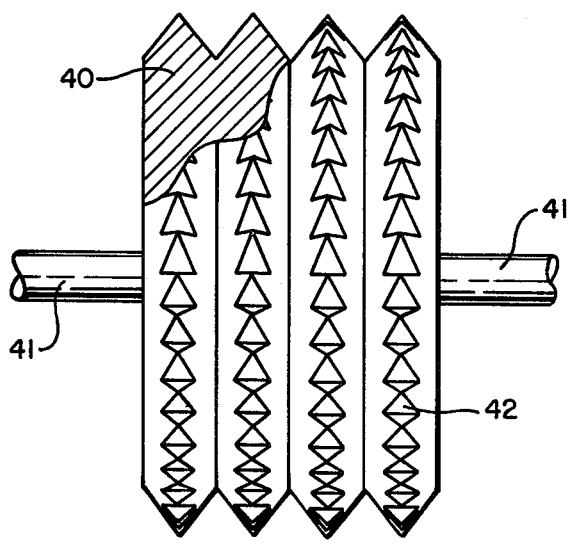
FIG. 9 shows a partial cross section of a multiple edge disk-like heat extracting member.

The practice of the invention by the method of extraction ejection from a pool of molten material, as shown in FIG. 1, or the practice of this invention by the extraction ejection from a molten pendant drop as shown in FIG. 4, may be carried out using multiple edged rotating heat-extracting disk-like members, an example of which is shown in FIG. 9.

In FIG. 9, a disk-like member 40 is supported for rotation on shaft 41. Member 40 has multiple outer "peripheral" edges which are provided with sloping serrations 42. The serration 42, have the same configuration and structure as that shown and previously described above for single edge disk-like members.

Multiple edge apparatus and methods are shown in U.S. Pat. No. 3,871,439 for the production of filament. In the multiple edge practice of this invention, each serrated edge (as shown) or a portion of a helix located on the peripheral surface of the heat-extracting member (not shown). In either case, the method of this invention is the same and the apparatus of this invention is the same.

Simultaneously multiple edges are brought into contact with the molten material. However, the rate of production of flake is increased in proportion to the number of disk edges presented to the molten material per unit of time, or per revolution of the wheel.

It has been found necessary under some circumstances to cool the disk 20, 20'. This may be done in various conventional ways, such as by passing water through a hollow interior of the disk. The amount of cooling, of course, is determined upon rate of heat extraction from the molten material.

Various evaluations of this invention have been made. Without limiting the scope of these inventions, it has been found that good product can be made using disks of 7¼ and 8 inches diameter. Eight inch diameter disks have been evaluated with 300, 600, 900 and 1200 serrations on their periphery. This represents serration spacings (P) of 0.084, 0.042, 0.028 and 0.021 inch respectively.

Contact angles $\theta$ of 3, 6, 12, 15 and 45 degrees were used in these evaluations from which suitable product was obtained.

Several multiple edge disks were tested with 60 and 90 degree taper angles $\alpha$ machined on the periphery of the screw thread. Spacings between threads of 0.05, 0.033 and 0.025 inch were evaluated with serrations prepared as previously described with the other embodiments of the invention. This spacing represented 20, 30 and 40 helical threads per inch.

The following summary of parameters and materials with which this invention has been practiced are shown in TABLE A.

TABLE A.

| | |
|---|---|
| Disk Materials | Copper, Brass, A-6 Steel |
| Disk Diameters | 7¼, 8 inches |
| Angle $\theta$ | 3,6,12,15 and 45 degrees |
| Serration Number per disk | 300, 600, 900 and 1200 |
| Serrations per inch of Circumference (P) | 15,18,20,24,36 and 48 |
| Disk Speed | 100 to 2000 RPM |
| Feed Rates of Material | Up to 1.5 lbs per hour per disk edge |
| Taper Angle $\alpha$ | 60 degrees and 90 degrees |
| Atmosphere | Air, Vacuum |
| Modes | Extraction from molten pool, Extraction from pendant drop. |
| Flake Materials | 304 SS, Ti-6Al-4V, Haynes Alloy No. 40, Zinc |

From the practice of the invention, it has been observed that the length of the flake particles will be some fraction of the serration spacing (P), being longer for greater spacings. However, the length L will decrease as the contact angle $\theta$ increases. Particle width (W) will depend on width of the "land", or the leading edge surface area. This is controlled with the taper angle $\alpha$ as well as the length L and the contact angle $\theta$. The thickness (T) of the particle will depend to some extent on the disk rotational speed, with higher speeds producing thinner particles. As a result, considerable control can be exerted on the shape and dimensions of individual flake particles.

It is believed that the leading edge surface, passing through the molten material, induces a component of motion in the liquid away from such surface. This component assists the liquid in making a clean break before it contacts the following serration leading edge surface. This is probably the reason why such tiny serrations (as small as P equals 0.02 inch) are successful in producing separate flake particles.

During successful operation the length L of a flake particle is less than the length (P) of a serration. This behavior is quite different from that of prior art melt extraction, where the edge of a notch contacts the liquid, which leads to irregularity in the filament following the notch.

The fluid motion induced by the contact angle $\theta$ is a very important aspect in the use of serrated-edge disks. As angle $\theta$ increases, the turbulence induced in the melt increases, and it becomes necessary to use lowered disk speeds in compensation. Therefore, serrations with contact angles over about 20 degrees, while workable, are not preferred. Contact angles $\theta$ from 3 to 12 degrees are much more preferable. It is to be noted that, as the contact angle $\theta$ and the circumferential distance P, are decreased, the height H is also decreased. When the height H is below about 0.001 inch, separation of the molten metal into individual particles becomes significantly less efficient. With height H at 0.003 inch, separation is not a problem. Thus, the minimum P for an angle $\theta$ of 3 degrees is probably about 0.01 to 0.02 inch. For a contact angle $\theta$ of 6 degrees, the minimum pitch P should be about half as much as for 3 degrees.

MODE OF OPERATION OF THE INVENTION

The following specific examples in conjunction with the teachings of the above specification and the cited prior art are sufficient to enable one skilled in the art to carry out the present invention as well as to understand what is presently known about the invention.

EXAMPLE I

Flakes were produced using molten pendant drop apparatus, in an air atmosphere, using an oxy-acetylene torch as the heat source for the material, and one-quarter-inch diameter 304 stainless steel as the material. The gas mixture was kept slightly acetylene rich, to limit oxidation of the molten droplet. An 8-inch diameter single-edge heat-extracting water-cooled disk of brass was rotated at a speed of 100 rpm (200 feet per minute). The stainless steel rod was fed to the disk at the rate of 0.15 inch per minute.

Good quality flake product was produced on this brass disk. The dimensions of the serrations were: $\theta = 3$ degrees, $\alpha = 90$ degrees, P=0.04 inch (600 serrations). The product had dimensions as shown in FIGS. 7 and 8 of: L=0.015 inch., W=0.01 inch, and T=0.002 inch. Such a flake particle weighed about $8.7 \times 10^{-8}$ pound.

EXAMPLE II

The method and apparatus of Example I was operated at 500 rpm to produce good product at a rate of about 1.57 pounds per hour.

EXAMPLE III

Flakes were produced using molten pool apparatus, in an air atmosphere, with molten zinc. An 8-inch diameter single-edge heat-extracting disk of brass was rotated at a speed of 100 rpm (200 feet per minute) and lowered into the surface of pool of the melt.

Good quality product was produced on this brass disk. The dimensions of the serrations were: θ=3 degrees, α=90 degrees, P=0.04 inch (600 serrations). The product had dimensions as shown on FIGS. 7 and 8 of: L=0.015 inch, W=0.01 inch and T=0.002 inch. Such a flake particle weighted about $4 \times 10^{-8}$ pound.

EXAMPLE IV

The method and apparatus of Example III was operated at 500 rpm to produce good product at a rate of about 0.7 pounds per hour.

EXAMPLE V

Flakes were produced using molten pendant drop apparatus, in an air atmosphere, using an oxy-acetylene torch as the heat source for the material, and one-quarter-inch diameter 304 stainless steel rod as the material. The gas mixture was kept slightly acetylene rich, to limit oxidation of the molten droplet. A 7½ inch diameter multiple edge heat extracting water-cooled disk of brass was rotated at a speed of 1100 RPM (2160 ft. per minute). The stainless steel rod was fed to the disk at a rate of 0.41 inch per minute.

Good quality product was produced on this brass disk. The dimensions of the serrations were θ=6 degrees, X=90 degrees, P=0.04 in (600 serrations), edge spacing=0.05 in (5 edges across ¼ in flat periphery). Such a flake particle weighed about $1.7 \times 10^{-8}$ lb.

EXAMPLE VI

Flakes were produced using molten pendant drop apparatus in vacuum, using an electron beam as the heat source for the material and an 3/16 inch diameter Ti-6al-4v alloy as the material. The same heat extracting water cooled disk as used in Example V was rotated at 350 RPM (664 ft. per minute). The titanium alloy rod was fed to the disk at a rate of 0.5 per minute.

Good quality product was produced. A flake particle product by this disk weighed about $10 \times 10^{-8}$ lbs.

EXAMPLE VII

Flakes were produced using molten pendant drop apparatus, in an air atmosphere, using an oxy-acetylene torch as the heat source for the material, and an ⅛ inch diameter 304 stainless steel rod as the material. The gas mixture was kept slightly acetylene rich to limit oxidation of the molten droplet. An inch diameter heat extracting water cooled disk of brass was rotated at a speed of 2000 RPM (4188 ft. per minute) the stainless steel rod was fed to the disk at a rate of 0.27 inch per minute.

Good quality product was produced on this brass disk. The dimensions of the serrations were θ=12 degrees, α=90 degrees, P=0.04 in (600 serrations). Such a flake particle weighed about $0.3 \times 10^{-8}$ lbs.

It has been found that the method of this invention, as practiced in Examples I thru VII, produces flake particles of metal which lose the bulk of their thermal energy (from the molten state) while in direct contact with the cooled metallic surface. This means that the quench rates are very rapid, believed to be in the order of $10^{-6}$ C. degrees per second. These quench rates produce a very homogeneous composition within the flake particles as well as a very fine grain size—usually less than one micron. In the process, control of the three dimensional shape of the flake particles is maintained by the form of the apparatus on which the flakes are formed.

It is herein understood that although the present invention has been specifically disclosed with the preferred embodiments and examples, modification and variations of these concepts herein disclosed may be resorted to by those skilled in the art. Such modifications and variations are considered to be within the scope of the invention and the appended claims.

What is claimed is:

1. A method of producing flake particles from molten material which is at a temperature within 25% of its equilibrium melting point in degrees K., said molten material having a viscosity of 0.001 to 1 poise and a surface tension of 10 to 2500 dynes per centimeter at said temperature, comprising:
    (a) rotating a heat extracting disk having a tapering serrated edge, the serrations of which are formed to present a leading edge surface at an angle to the tangent of the circle generated by the rotation of the base of the serration;
    (b) impacting the serrations of said serrated edge onto the surface of said molten material to form a discrete flaked particle on the leading edge surface of each serration and removing heat from said particle at least partially solidifying said particle on said serration;
    (c) releasing said particle from said serration; and
    (d) cooling said particle in a surrounding atmosphere.

2. The method of claim 1, wherein said molten material contacted in step (b) is contained in a molten pool.

3. The method of claim 1, wherein said molten material contacted in step (b) is formed in a pendant drop.

4. The method of claim 1 wherein said serrations of step (a) are formed to present a leading edge at an angle of at least 3°, to the tangent of the circle generated by the rotation of the the base of the serration.

5. The method of claim 1, wherein said molten material is contacted by between 300 and 1200 serrations per revolution of said heat extracting member.

6. The method of claim 1, wherein the peripheral speed of the outer tips of said serrations is in the range between about 200 feet per minute and about 3000 feet per minute.

7. The method of claim 4, wherein the leading edge surface of each serration on said heat extracting disk member is brought into contact with the said molten material at an angle to impact said leading edge surface against the surface of said material providing a quench rate sufficient to cool said molten material in contact with said surface at a rate of at least $10^5$ C. degrees per second.

8. The method of claim 1 wherein said heat extracting disk member has multiple adjacent peripheral rows of serrations to contact said molten material substantially simultaneously.

9. The method of claim 1 wherein said edge taper angle is in the range between about 60 degrees to about 90 degrees.

10. The method of claim 1 wherein said edge taper angle is in the range between about 60 degrees and about 90 degrees and the angle of contact of said leading edge surface is at least 3 degrees.

11. The method of claim 1 wherein the releasing of said particles in step (c) is by centrifugal force.

12. The method of claim 1 wherein the releasing of said particles in step (c) is assisted by wiping said serrations after said particles are at least partially solidified.

13. The method of claim 1 wherein said molten material is selected from the group consisting of metals and metal alloys.

14. The method of claim 1 wherein said molten material is selected from the group of a metal, a metal alloy, and an inorganic compound.

* * * * *